No. 3,406,128
THERMOSET RESIN AND METHOD
FOR MAKING IT
Sachio Nishimura and Naoaki Hata, Arakawa-ku, Tokyo,
 Japan, assignors to Asahidenka Kogyo Kabushiki Kai-
 sha, Tokyo, Japan, a corporation of Japan
No Drawing. Filed Sept. 23, 1963, Ser. No. 310,886
 Claims priority, application Japan, Sept. 26, 1962,
 37/41,252
14 Claims. (Cl. 260—2.5)

ABSTRACT OF THE DISCLOSURE

A thermoset synthetic resin having a high adhesiveness to metals and a high durability to fluorinated hydrocarbons, produced by reacting an organic polyisocyanate with a reaction product of an epoxidized diolefin polymer with a hydroxyalkylamine.

This invention relates to a novel synthetic resin and to a method for making it.

More particularly, this invention relates to a method for curing polyepoxides and to the cured products resulting therefrom.

It is well known that epoxidized polymers of diolefin compounds can be cured by reacting with organic polybasic acids, organic polybasic acid anhydrides, polyphenols or polyamines to produce resinous materials. However, the cured resins produced by such process have a defect that they are insufficient in their adhesiveness to metals and their durability to organic solvents, specifically to fluorinated hydrocarbons.

An object of the present invention is to provide a process for producing a new synthetic resin having a high adhesiveness to metals and a high durability to organic solvents, specifically to fluorinated hydrocarbons.

Another object of the present invention is to provide a process for obtaining a surface coating having a high adhesiveness to metals and a high durability to organic solvents, specifically to fluorinated hydrocarbons.

A further object of the present invention is to provide a process for producing an elastic or hard new synthetic resin or foamed material.

The thermoset resins of this invention can be produced by reacting (a) the fusible soluble reaction product of at least one polyepoxide selected from the group consisting of epoxidized polymers of diolefin compounds with at least one amino compound having at least one hydroxyl group and at least one amino group selected from the group consisting of primary amino groups and secondary amino groups with (b) at least one isocyanate having at least two —NCO groups, said polymer of diolefin having an average molecular weight from about 250 to about 250,000.

The most preferable method for the production of thermoset resins of this invention comprises reacting (a) the fusible, soluble reaction product of at least one polyepoxide selected from the group consisting of epoxidized polymers of diolefin compounds with at least one amino compound selected from the group consisting of the compounds having the general formula

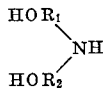

and the compounds having the general formula $HOR_3NH_2$ wherein $R_1$, $R_2$ and $R_3$ represent alkylene groups having from 1 to 8 carbon atoms with (b) at least one isocyanate having at least two —NCO groups, said polymer of diolefin having an average molecular weight from about 250 to about 250,000, and said amino compound being employed in such an amount that the amount of the amino group of said amino compound is from 20 to 100 percent, particularly 50 to 80 percent, of the amount required for complete reaction with the epoxy groups of said polyepoxide.

The reaction of said polyepoxide and said amino compound can be carried out with conventional inert organic solvent(s) or/and conventional catalyst(s), if necessary.

And also the reaction of (a) said reaction product and (b) said isocyanate can be carried out with conventional catalyst(s) if necessary, and in this reaction a third component having active hydrogen atom(s) can be polymerized with (a) and (b), if desired.

For polymers of diolefin compounds to be used in the process of the present invention can be exemplified polybutadienes, polyisoprenes, polychloroprenes, polycyclopentadienes, styrene-butadiene copolymers, vinyltoluene-butadiene copolymers, acrylonitrile-butadiene copolymers, butadiene-vinylpyridine copolymers, acrylate-butadiene copolymers, isobutylene-isoprene copolymers and styrene-acrylonitrile-butadiene terpolymers. According to the polymerization process, they can produce such various types of polymers as 1,2-addition polymers, 3,4-addition polymers, 1,4-addition polymers and cis-, trans- and isotactic and syndiotactic polymers and their mixed polymers. Copolymers in the form of blocks or grafts can be also produced. In their polymerization conventional radical polymerization or ionic polymerization is carried out by using a catalyst, for example, peroxides, metallic sodium, metallic potassium, metallic lithium and these metallic alkyl, trialkyl aluminum and Lewis acids, such as titanium tetrachloride or by using ionizing radiation. The molecular weight of the ploymer to be produced can be widely varied depending on the polymerizing conditions, the kind and amount of addition of the catalyst and whether a chain transfer agent is present or not. However, for the objects of the present invention, a polymer or copolymer of an average molecular weight of 250 to 250,000 is proper. Further, derivatives of such polymers of diolefin compounds, that is, their partial decomposition polymers or cyclized compounds can be also used in the process of the present invention. Such polymers of diolefin compounds can be epoxidized by any of such known epoxidizing agents as peracetic acid, performic acid, perpropionic acid, pertrifluoroacetic acid, perbenzoic acid and perphthalic acid. They can be epoxidized also by a so-called simultaneous epoxidizing process in the presence of hydrogen peroxide and such active oxygen carrier as acetic acid, formic acid or sucrose and such catalyst as sulfuric acid, phosphoric acid, toluene sulfonic acid, sodium hydroxide, potassium hydroxide or any ion exchange resin. Such polymers of diolefin compounds are dissolved in such solvent as benzene, toluene, xylene or chloroform and epoxidized usually at a temperature of 0° to 80° C. The degree of epoxidation depends on the equivalent ratio of the active oxygen of the peracid or hydrogen peroxide to the double bond of polymers of diolefin compounds. In the present invention, the unsaturated bonds contained in the original polymer are substantially completely or partially epoxidized to contain more than 1% by weight or preferably more than 1.5% by weight of epoxy oxygen. Further, in the epoxidizing reaction, hydroxyl groups or ester bonds are formed by a hydrolyzing reaction of the epoxy group or the reaction of epoxy group with the acid. As desired, the velocity of such secondary reaction can be reduced by the addition of sodium acetate. However, for the objects of the present invention, it is not necessary to control especially such secondary reaction.

The amino compounds having at least one hydroxyl group and at least one amino group selected from the group consisting of primary amino groups and secondary amino groups to be used in this invention include amino alcohols such as, for example, ethanolamine, diethanolamine, propanolamine, dipropanol amine, butanolamine, dibutanolamine, hexanolamine, partially hydroxyalkylated polyamines produced by reacting polyamines with alkyleneoxides such as, for example, monohydroxyethyl diethylenetriamine, di(hydroxyethyl)diethylenetriamine, N-mono-(2-hydroxypropyl)ethylenediamine, N,N'-di-(2-hydroxypropyl)ethylenediamine, aromatic aminoalcohols such as, for example, aminobenzyl alcohol, and aminophenols such as, for example, aminophenol, amino methylphenol, tris(aminomethyl)phenol.

The compounds having at least one hydroxyl group and at least one primary or secondary amino group in the molecule used in the present invention are not limited to the above exemplified compounds. They generally include all the compounds having at least one hydroxyl group and at least one primary or secondary amino group in the molecule and including also methylol ureas, methylol melamines, methylol guanamines.

The reaction of the epoxidized polymers of diolefin compounds with said compound containing hydroxyl and amino groups will gradually proceed even without any catalyst at the room temperature. However, in order to reduce the reaction time to an industrially advantageous proper time, it is desirable to heat them usually to a temperature above 70° C.

In this case, the reaction is effectively accelerated by the addition of the catalyst as follows:

Lewis acids such as boron trifluoride and its complexes of ethers, amines and alcohols, stannic chloride, titanium tetrachloride and the like;

Organic metal compounds such as stannous octoate, dibutyltin dilaurate, tetrabutyltitanate, zinc octoate, cobalt octoate zirconium octoate, cerium octoate, and the like; organic phosphites such as triphenylphosphite, trioctylphosphite, etc.;

Phenols like phenol, resorcinol, catechol, bisphenol, etc.

In the stoichiometrical relation between the epoxidized polymers of diolefin compounds and the hydroxyl group-amino group containing compound to be reacted with it the epoxy group and the amino group are equivalent to each other in the mixture. However, in practice, as described later, in order to prevent the production of a gel, this equivalent relation can be allowed to have a considerably wide latitude above and below it. It is preferable to select the equivalent ratio of the epoxy group to active hydrogen contained in the amino group to be in a range of 1:5 to 10:1. It is also desirable to select the amount of addition of the catalyst to be in a range of 0.01 to 5% of the epoxidized polymers of diolefin compounds.

Cured resinous materials are obtained by the reaction of epoxidized polymers of diolefin compounds and the said compound containing hydroxyl group-amino group and then by the reaction of the above reaction product and a compound having at least two isocyanate groups in the molecule such as toluenediisocyanate, naphthalene diisocyanate, diphenylmethane diisocyanate, hexamethylene diisocyanate, ethylene diisocyanate, trimethylene diisocyanate, tetramethylene diisocyanate, decamethylene diisocyanate, p-phenylene diisocyanate, m-phenylene diisocyanate, benzene-1,3,5-triisocyanate, ethylbenzene-2,4,6-triisocyanate, monochlorobenzene-2,4,6-triisocyanate, triphenylmethane-4,4',4''-triisocyanate, diphenylmethane-4,4'-diisocyanate, 3,3'-dimethoxy-4,4'-diisocyanatebiphenyl, and other known aliphatic and aromatic diisocyanates or polyisocyanates, or phenol complexes thereof. This reaction proceeds rapidly without any catalyst at the room temperature but is accelerated effectively by the addition of known isocyanate-active hydrogen reaction catalyst such as tertiary amines like triethylamine, dimethyl-benzylamine, triethylenediamine, alkylmorpholine, etc.; organic metal compounds like stannous octoate, dibutyltindilaurate, tetrabutyltitanate, cerium octoate, diethyl lead, tetraethyl lead, etc.; triethylphosphine, tributylphosphine, trialkylarsine, trialkylbismuth, trialkyl antimony, etc.

Further, in this reaction, such active hydrogen containing compound as any of water, polyhydric alcohols, polyesters, phenols, polybasic carboxylic acids, polyoxyalkylene polyols, polyesters having a hydroxyl group or carboxyl group at the terminal and epihalogenohydrin-polyhydric phenol condensates may be added as a third component for the reaction so that such third component, the reaction product of the epoxidized polymers of diolefin compounds with said hydroxyl radical-amino radical containing compound and a di- or polyisocyanate compound may be copolymerized with one another in the form of a crosslinkage to produce resinous materials. The theoretical mixing ratio of the di- or polyisocyanate in such reaction is such that the sum of the active hydrogen in the product of the reaction of the epoxidized polymers of diolefin compounds with said hydroxyl group and amino group containing compound, and the unreacting epoxy group is equivalent to isocyanate group. However, in practice, such equivalent relation is allowed to have a considerably wide latitude above and below it. Further, when the reaction is caused with the addition of said third component containing active hydrogen, the active hydrogen of said third component will also react with the isocyanate and therefore it will be necessary to increase the isocyanate mixing amount in response to that. It is usually desirable to select the composition of the reaction system so as to be in a range showing an equivalent relation of the epoxy group+active hydrogen atom:isocyanate group=0.3 to 5.0:1.

As described above, the reaction of the active hydrogen with the isocyanate radical will proceed rapidly even at the normal temperature. But the reaction of the epoxy group with the isocyanate group will proceed substantially at a temperature above 80° C. Further, such complex compound of an isocyanate with a phenol as, for example, triphenylurethane having the formula

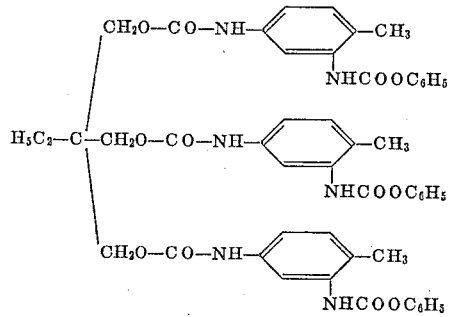

will react substantially with active hydrogen and epoxy group at a temperature above 10° C. Therefore, the reaction temperature is different depending on the conditions adopted in the process of the present invention but is selected usually to be between the room temperature and 400° C. The reaction time is required to be in the range of several hundred hours to several seconds also depending on these conditions.

As described above, the process of the present invention is carried out by making (A) epoxidized polymers of diolefin compounds react with (B) a compound having at least one hydroxyl group and at least one primary or secondary amino group in the molecule and then making (C) a compound having at least two isocyanate groups in the molecule react with the above reaction product of (A) and (B). Therefore, the properties of the resin produced by the process of the present invention will vary depending on the kinds and the stoichiometrical relation of the above mentioned respective components (A), (B) and (C). Thus products of various physical properties in a wide range from elastic rubbery polymers to hard resinous polymers can be obtained. However, in order to obtain a resinous product which has a high adhesiveness to metals and a high durability to organic solvents, specifically to fluorine containing solvents and which is one of the objects of the present invention, it is recommended to so select the kinds and stoichiometrical relation of the above mentioned components (A), (B) and (C) that the nitrogen atom content in the molecule of the produced resin may be more than 1% by weight or preferably more than 3% by weight. In industrially working the process of the present invention, the reaction of the component (C) with the reaction product (AB) of the components (A) and (B) is carried out in a liquid or solid state. However, in case the reaction is to be carried out in a liquid state, it is necessary that the reaction product (AB) itself should be a liquid or should dissolve in a solvent or the component (C). In case the reaction is to be carried out in a solid state, it is necessary that the reaction product (AB) and the component (C) should contact and mix with each other under a proper temperature or pressure. It is therefore necessary for the kinds, stoichiometrical relation and reaction rate of the components (A) and (B) that such condition as will produce an insoluble and infusible gel or a so-called C-stage should be avoided and that such condition as will give the reaction product (AB) in a so-called B-stage substantially soluble in solvents and having fluidity under a proper temperature or pressure should be selected. In case the component (B) is a compound having one secondary amino group in the molecule, whatever reaction conditions may be selected, the reaction product (AB) will keep the B-stage. But, when a compound having more than two active hydrogen atoms in the amino group is used for the component (B), it is necessary that the production of a gel should be avoided by using either of the components (A) and (B) in excess. The condition for producing the fusible, soluble reaction product (AB) being not in gel state can be derived by using a known calculating formula for gelling, for example, the calculating formula mentioned on pages 347 to 383 of "Principles of Polymer Chemistry" by P. J. Flory (published by Cornell University Press Co.) from the functionality and reaction rates of the components (A) and (B). And in the method of this invention it is desired that (A) be employed in an excess amount to the one corresponding to the amount for reacting completely with (B).

When the process of the present invention is to be applied to the production of molded articles, embedded articles or sealed articles, the reaction of the process of the present invention is carried out in any desired mold. When it is to be applied as an adhesive, said reaction is carried out between the surfaces of the objects to be bonded. When the process of the present invention is to be applied to such surface coating as painting and electric wire coating, the reaction mixture of the present invention is dissolved in a solvent, is applied onto the surface of the material to be coated and, while the solvent is being evaporated, said reaction can be made to proceed. Further, laminates can be produced by applying the process of the present invention to natural fiber cloth, synthetic fiber cloth or glass cloth as impregnated. In such case, a so-called wet lamination can be carried out without solvent or a dry lamination in a two-step system can be carried out by laminating and pressing a pre-preg in the B-stage prepared on the cloth in a solvent system. Further, when the process of the present invention is to be applied to the production of a foamed material, the reaction is carried out in a gas generating condition or a material which will be gasified at the reaction temperature is added so that the gasification may take place simultaneously with the reaction or a gas is forcibly blown into the system while the reaction is proceeding. Thus, in either case, when a resin is made so that such gas may be contained in the reaction product, an elastic or hard foamed material will be produced. The process of the present invention can be worked also in the presence of a color, pigment or filler.

Thus there are various manners of working the process of the present invention. The synthetic resin obtained by the process of the present invention has a high adhesiveness to metals and a high durability to organic solvents, specifically to fluorine containing solvents and is an elastic or hard strong new synthetic resin.

Example I

A mixture of 100 parts of epoxidized polybutadiene having an average molecular weight of 2500 and epoxy oxygen of 8.8 percent, 50 parts of diethanolamine and 100 parts of xylene was stirred in the three necked flask equipped with a reflux condenser, a mechanical stirrer and a thermometer for 10 hours at 150° C.

25 parts of the resulting product was mixed with 13 parts of tolylene diisocyanate and the above mixture was coated on tin plate and heated for 2 hours at 80° C. and then 2 hours at 140° C.

The resulting coating remained unchanged after immersing in Freon 22 (monochlorodifluoromethane) for 10 days in an autoclave. The coating exhibited still good adhesion.

Example II

Butadiene-acrylonitrile copolymer having an average molecular weight of 5000 and an acrylonitrile content of 33.3% was epoxided by peracetic acid in benzene solution and epoxidized copolymer of 1.6% oxirane content was obtained.

A mixture of 100 parts of the epoxidized copolymer obtained by the process described above, 5 parts of monoethanolamine and 100 parts of cresol was stirred in the presence of 0.1 part of $BF_3$-monoethylamine complex for 6 hours at 130° C.

The reaction product was cooled to room temperature and 50 parts of triphenylurethane having the formula

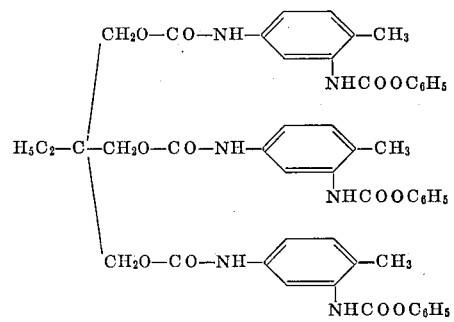

were added thereto. Coated copper wire of 0.5 mm. dia. was prepared by dip coating in the material obtained as above and heating for one minute at 250° C.

One end of above wire cut in 20 cm. was fixed and another end was twisted 100 times. As a result, peeling of coated film was not observed.

Example III

A mixture of 100 parts of epoxidized polybutadiene having an average molecular weight of 1200 and an epoxy oxygen of 8.8 percent and 50 parts of diethanolamine was stirred in the presence of 0.1 part of stannous octoate for 4 hours at 160° C.

To 15 parts of the resulting product was added 15 parts of toluene diisocyanate, 1.2 parts of water, 0.1 part of silicone oil and 0.3 part of triethylene diamine and mixed.

Then, the mixture was foamed and by heating for 4 hours at 70° C., hard foamed material was obtained. The foamed material obtained as above had a specific gravity of 0.062 and a compressive strength of 3.4 kg./cm.$^2$, and after immersion in trichloroethylene for 24 hours, swelling was not observed.

Example IV

A mixture of 100 parts of epoxidized butadieneacrylonitrile copolymer prepared as in Example II and 5 parts of monoethanolamine was stirred in the presence of 0.1 part of tetrabutyltitanate for 8 hours at 130° C.

To the resulting product was added 27 parts of toluene diisocyanate, 1.8 parts of water, 0.2 part of silicone oil and 0.4 part of triethylene diamine and by stirring vigorously, flexible foamed material having a specific gravity of 0.048 was obtained.

What is claimed is:

1. A foamed thermoset resin which comprises the reaction product of (a) a fusible reaction product of a polyepoxide selected from the group consisting of epoxidized polymers of diolefin compounds containing more than one percent by weight of epoxy oxygen with an amino compound selected from the group consisting of the compounds having the general formula

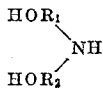

and the compounds having the general formula $HOR_3NH_2$, wherein $R_1$, $R_2$ and $R_3$ represent alkylene groups having from one to eight carbon atoms, with (b) an organic isocyanate having at least two —NCO groups, and with (c) water, said polymers of diolefin compounds having an average molecular weight from about 1,000 to about 10,000 and said amino compound being employed in such an amount that the amount of the amino group of said amino compound is from 50 to 80 percent of the amount required for complete reaction with the epoxy groups of said polyepoxide.

2. A coating composition which comprises the reaction product of (a) the reaction product of a polyepoxide selected from the group consisting of epoxidized polymers of diolefin compounds containing more than one percent by weight of epoxy oxygen with an amino compound selected from the group consisting of the compounds having the general formula

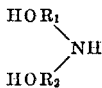

and the compounds having the general formula $HOR_3NH_2$, wherein $R_1$, $R_2$ and $R_3$ represent alkylene groups having from one to eight carbon atoms, in such an amount that the amount of the amino group of said amino compound is from 50 to 80 percent of the amount required for complete reaction with the epoxy groups of said polyepoxide, with (b) an organic isocyanate having at least two —NCO groups, and (c) an inert organic solvent thereof, said polymers of diolefin compounds having an average molecular weight from about 1,000 to about 10,000.

3. A thermoset resin composition which comprises the reaction product of (a) a fusible, soluble reaction product of a polyepoxide selected from the group consisting of epoxidized polymers of diolefin compounds containing more than one percent by weight of epoxy oxygen with an amino compound selected from the group consisting of the compounds having the general formula

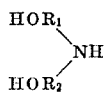

and the compounds having the general formula $HOR_3NH_2$, wherein $R_1$, $R_2$ and $R_3$ represent alkylene groups having from one to eight carbon atoms, in such an amount that the amount of the amino group of said amino compound is from 20 to 100 percent of the amount required for complete reaction with the epoxy groups of said polyepoxide, and (b) an organic isocyanate having at least two —NCO groups, said polymers of diolefin compounds having an average molecular weight from about 250 to about 250,000.

4. A thermoset resin composition which comprises the reaction product of (a) a fusible, soluble reaction product of a polyepoxide selected from the group consisting of epoxidized polymers of diolefin compounds containing more than one percent by weight of epoxy oxygen with an amino compound selected from the group consisting of the compounds having the general formula

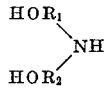

and the compounds having the general formula $HOR_3NH_2$, wherein $R_1$, $R_2$ and $R_3$ represent alkylene groups having from one to eight carbon atoms, in such an amount that the amount of the amino group of said amino compound is from 20 to 100 percent of the amount which is equivalent to the epoxy groups of said polyepoxide, and (b) an aromatic polyisocyanate, said polymers of diolefin compounds having an average molecular weight from about 250 to about 250,000.

5. A thermoset resin composition which comprises the reaction product of (a) a fusible, soluble reaction product of a polyepoxide selected from the group consisting of epoxidized polymers of diolefin compounds containing more than one percent by weight of epoxy oxygen with an amino compound selected from the group consisting of the compounds having the general formula

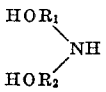

and the compounds having the general formula $HOR_3NH_2$, wherein $R_1$, $R_2$ and $R_3$ represent alkylene groups having from one to eight carbon atoms, in such an amount that the amount of the amino group of said amino compound is from 50 to 80 percent of the amount required for complete reaction with the epoxy groups of said polyepoxide, and (b) an organic isocyanate having at least two —NCO groups, said polymers of diolefin compounds having an average molecular weight from about 250 to about 250,000.

6. A thermoset resin composition which comprises the reaction product of (a) a fusible, soluble reaction product of a polyepoxide selected from the group consisting of epoxidized polymers of diolefin compounds containing more than one percent by weight of epoxy oxygen with an amino compound selected from the group consisting of the compounds having the general formula

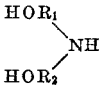

and the compounds having the general formula $HOR_3NH_2$, wherein $R_1$, $R_2$ and $R_3$ represent alkylene groups having from one to eight carbon atoms, in such an amount that the amount of the amino group of said amino compound is from 50 to 80 percent of the amount which is equivalent to the epoxy groups of said polyepoxide, and (b) an aromatic polyisocyanate, said polymers of diolefin compounds having an average molecular weight from about 250 to about 250,000.

7. A thermoset resin composition which comprises the reaction product of (a) a fusible, soluble reaction product of a polyepoxide selected from the group consisting of epoxidized polymers of diolefin compounds containing more than one percent by weight of epoxy oxygen with an amino compound selected from the group consisting of the compounds having the general formula

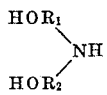

and the compounds having the general formula $HOR_3NH_2$, wherein $R_1$, $R_2$ and $R_3$ represent alkylene groups having from one to eight carbon atoms, in such an amount that the amount of the amino group of said amino compound is from 20 to 100 percent of the amount required for complete reaction with the epoxy groups of said polyepoxide, and (b) an organic isocyanate having at least two —NCO groups, said polymers of diolefin compounds having an average molecular weight from about 1,000 to about 10,000.

8. A thermoset resin composition which comprises the reaction product of (a) a fusible, soluble reaction product of a polyepoxide selected from the group consisting of epoxidized polymers of diolefin compounds containing more than one percent by weight of epoxy oxygen with an amino compound selected from the group consisting of the compounds having the general formula

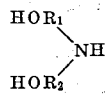

and the compounds having the general formula $HOR_3NH_2$, wherein $R_1$, $R_2$ and $R_3$ represent alkylene groups having from one to eight carbon atoms, in such an amount that the amount of the amino group of said amino compound is from 20 to 100 percent of the amount required for complete reaction with the epoxy groups of said polyepoxide, and (b) an organic isocyanate having at least two —NCO groups, said polymers of diolefin compounds having an average molecular weight from about 250 to about 250,000 and said organic isocyanate being employed in an amount corresponding to from about 20 to about 300 percent of the amount required for complete reaction with active hydrogen atoms and epoxy groups contained in said polyepoxide-amino compound reaction product.

9. A thermoset resin composition which comprises the reaction product of (a) the fusible, soluble reaction product of a polyepoxide selected from the group consisting of epoxidized polymers of diolefin compounds containing more than one percent by weight of epoxy oxygen with an amino compound selected from the group consisting of the compounds having the general formula

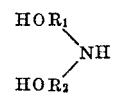

and the compounds having the general formula $HOR_3NH_2$, wherein $R_1$, $R_2$ and $R_3$ represent alkylene groups having from one to eight carbon atoms, and (b) an organic isocyanate having at least two —NCO groups, said polymers of diolefin compounds having an average molecular weight from about 1,000 to about 10,000 and said organic isocyanate being employed in an amount corresponding to from about 20 to about 300 percent of the amount required for complete reaction with active hydrogen atoms and epoxy groups contained in said polyepoxide-amino compound reaction product.

10. A thermoset resin composition which comprises the reaction product of (a) a fusible, soluble reaction product of a polyepoxide selected from the group consisting of epoxidized polymers of diolefin compounds containing more than one percent by weight of epoxy oxygen with an amino compound selected from the group consisting of the compounds having the general formula

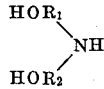

and the compounds having the general formula $HOR_3NH_2$, wherein $R_1$, $R_2$ and $R_3$ represent alkylene groups having from one to eight carbon atoms, and (b) an aromatic polyisocyanate, said polymers of diolefin compounds having an average molecular weight from about 1,000 to about 10,000 and said amino compound being employed in such an amount that the amount of the amino group of said amino compound is from 50 to 80 percent of the amount required for complete reaction with the epoxy groups of said polyepoxide.

11. A thermoset resin composition which comprises the reaction product of (a) the fusible, soluble reaction product of a polyepoxide selected from the group consisting of epoxidized polymers of diolefin compounds containing more than one percent by weight of epoxy oxygen with an amino compound selected from the group consisting of the compounds having the general formula

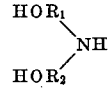

and the compounds having the general formula $HOR_3NH_2$, wherein $R_1$, $R_2$ and $R_3$ represent alkylene groups having from one to eight carbon atoms, in such an amount that the amount of the amino group of said amino compound is from 20 to 100 percent of the amount required for complete reaction with the epoxy groups of said polyepoxide, and (b) an aromatic polyisocyanate, said polymers of diolefin compounds having an average molecular weight from about 1,000 to about 10,000 and being selected from the group consisting of homogeneous polymers of conjugated diolefin compounds and copolymers of conjugated diolefin compounds and mono-olefin compounds.

12. A thermoset resin composition which comprises the reaction product of (a) the fusible, soluble reaction product of a polyepoxide selected from the group consisting of epoxidized polymers of diolefin compounds containing more than one percent by weight of epoxy oxygen with an amino compound selected from the group consisting of the compounds having the general formula

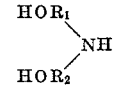

and the compounds having the general formula $HOR_3NH_2$, wherein $R_1$, $R_2$ and $R_3$ represent alkylene groups having from one to eight carbon atoms, in such an amount that the amount of the amino group of said amino compound is from 50 to 80 percent of the amount required for complete reaction with the epoxy groups of said polyepoxide, and (b) an aromatic polyisocyanate, said polymers of diolefin compounds having an average molecular weight from about 1,000 to about 10,000 and being selected from the group consisting of polybutadiene and butadiene-acrylonitrile copolymers.

13. A foamed thermoset resin composition which comprises the reaction product of (a) the fusible reaction product of a polyepoxide selected from the group consisting of epoxidized polymers of diolefin compounds containing more than one percent by weight of epoxy oxygen with an amino compound selected from the group consisting of the compounds having the general formula

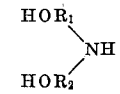

and the compounds having the general formula $HOR_3NH_2$, wherein $R_1$, $R_2$ and $R_3$ represent alkylene groups having from one to eight carbon atoms, in such an amount that the amount of the amino group of said amino compound is from 50 to 80 percent of the amount required for complete reaction with the epoxy groups of said polyepoxide, and (b) an organic isocyanate having at least two —NCO groups, said polymers of diolefin compounds having an average molecular weight from about 1,000 to about 10,000.

14. A coating composition which comprises the reaction product of (a) a reaction product of a polyepoxide selected from the group consisting of epoxidized polymers of diolefin compounds containing more than one percent by weight of epoxy oxygen with an amino compound selected from the group consisting of the compounds having the general formula

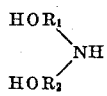

and the compounds having the general formula $HOR_3NH_2$, wherein $R_1$, $R_2$ and $R_3$ represent alkylene groups having from one to eight carbon atoms, in such an amount that the amount of the amino group of said amino compounds is from 50 to 80 percent of the amount required for complete reaction with the epoxy groups of said polyepoxide, and (b) triphenylurethane having the formula

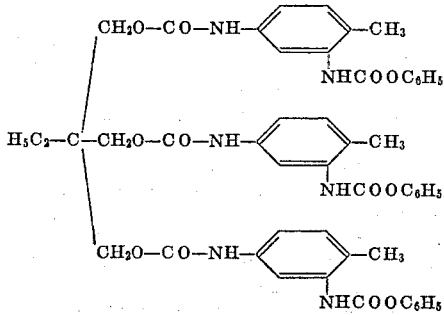

and (c) an inert organic solvent thereof, said polymers of diolefin compounds having an average molecular weight from about 1,000 to about 10,000.

References Cited

UNITED STATES PATENTS

| | | | |
|---|---|---|---|
| 2,660,563 | 11/1953 | Banes et al. | 260—2 |
| 2,864,775 | 12/1958 | Newey | 260—2 |
| 2,921,039 | 1/1960 | McKay et al. | 260—2.5 |
| 2,968,647 | 1/1961 | Koenecke et al. | 260—77.5 |
| 3,084,177 | 4/1963 | Hostettler et al. | 260—2.5 |

DONALD E. CZAJA, *Primary Examiner.*

M. B. FEIN, *Assistant Examiner.*